(No Model.)
W. A. WILSON.
CHURN.
No. 268,969.   Patented Dec. 12, 1882.
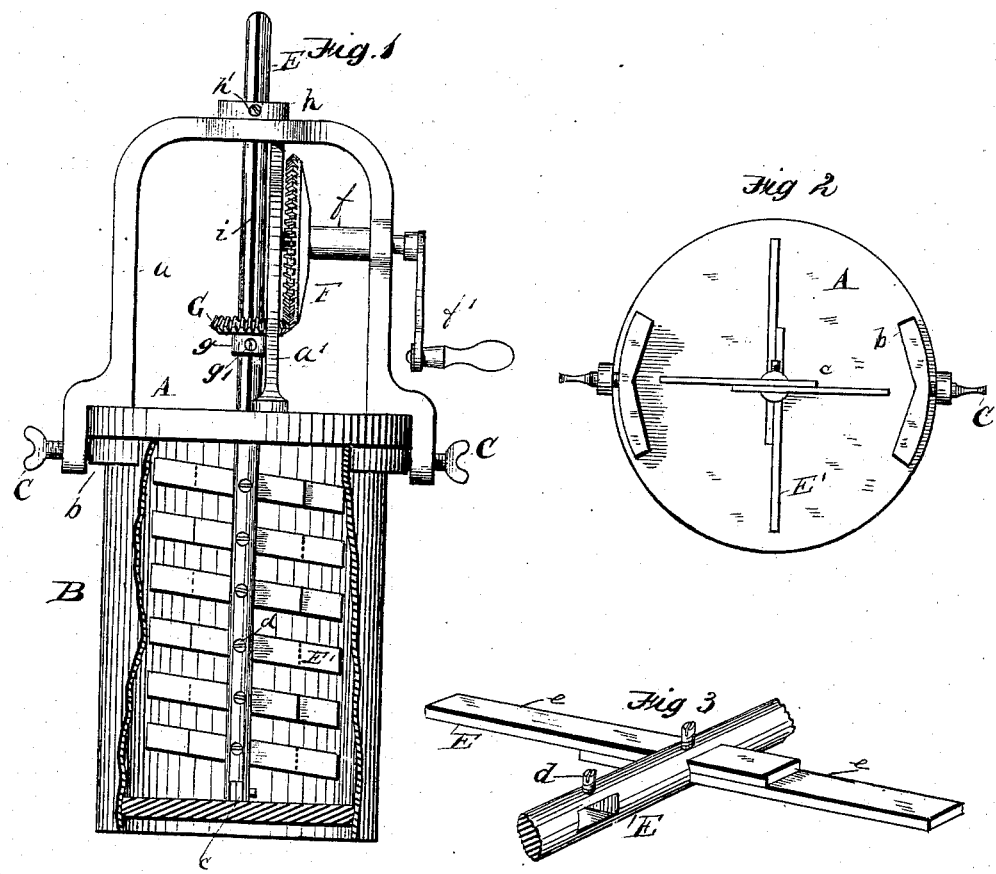
WITNESSES
INVENTOR
Wm. A. Wilson
By Edson Bros.
his Attorneys
N. PETERS, Photo-Lithographer, Washington, D. C.

UNITED STATES PATENT OFFICE.

WILLIAM A. WILSON, OF FRUIT PLAIN, VIRGINIA.

CHURN.

SPECIFICATION forming part of Letters Patent No. 268,969, dated December 12, 1882.

Application filed April 12, 1882. (No model.)

*To all whom it may concern:*

Be it known that I, WILLIAM A. WILSON, a citizen of the United States, residing at Fruit Plain, in the county of Northumberland and State of Virginia, have invented certain new and useful Improvements in Churns, of which the following is a specification, reference being had therein to the accompanying drawings, in which—

Figure 1 is a side elevation, partly in section, of my churn. Fig. 2 is an inverted view of the cover, its adjuncts, and the dasher removed from the cream receptacle or vessel. Fig. 3 is a perspective view of a portion of the dasher.

This invention pertains to improvements in churns, having special reference to the dasher and the cover attachment, its object being to enable the ready adjustment of the cover and dasher to any desired size of receptacle or vessel, and to effect with facility and perfectly the churning process.

The nature of this invention consists in providing the dasher with extensible and contractible blades or wings passed through and adjustable in the staff or shaft of the dasher, substantially as hereinafter more fully set forth and claimed.

To carry out my invention I employ a cover, A, which is suitably packed cream-tight upon the cream receptacle or vessel B. It consists of an angularly-flanged disk, upon which are secured two upright frames or bows, a a'. The lower ends or feet of the bow a are extended downward at the sides of and below the cover A to form brackets b b.

C C are set or holding screws working in the brackets b, and enabling the adjustment and fastening of the cover to any desired size of cream receptacle or vessel. When applied to an earthenware receptacle or one of other material that will not afford a sufficient bearing-surface for the binding ends of the screws, I provide them with clamps to overcome that difficulty, which bear, under the pressure of the screws, against the receptacle or vessel and upon a comparatively large surface thereof.

E is a dasher shaft or staff, with its lower end slightly above the bottom of the receptacle, and having thereat a horizontal blade, c, which acts on the lower stratum of cream— that next to the bottom of the receptacle. This shaft has a series of blades, E', arranged therein one above the other in parallel oblique plane, the purpose of which is to expose those particles received between the spaces of the blades on one side, and consequently failed to have been acted on thoroughly, to the action of the blades on the other side of the dasher. Each blade or wing E' consists of two sections, e e, passed through an aperture or slot in the shaft and lapping each other, as clearly shown in Fig. 3, by which the blade can be extended to suit a larger receptacle, as the occasion may require. Holding or binding screws d, working in the shaft E, and securing therein the sections of blades, permit their aforesaid adjustment. The shaft, with its blades, is driven or revolved by a gear-wheel, F, on the end of a shaft, f, having a handle, f', and journaled in the bows a a', said wheel gearing with a horizontal pinion, G, on the said shaft. This pinion is connected to the shaft by a sleeve, g, and set-screw g', and to the shaft above the bow or frame a is applied a collar, h, resting upon said bow and supporting the entire weight of the dasher, and having a set-screw, h'. The set-screws g' h' work or bear in a slot, i, extending in the direction of the length of the shaft, to give them a securer bearing thereon. This arrangement permits the raising or lowering of the shaft to accommodate the depth of the cream-receptacle according to its size.

I claim and desire to secure by Letters Patent—

In a churn, the dasher consisting essentially of the shaft having a series of transverse slots, a series of independently extensible and contractible blades, each composed of two sections lapping each other, and held together by adjusting-screws, as and for the purpose set forth.

In testimony whereof I affix my signature in presence of two witnesses.

WILLIAM A. WILSON.

Witnesses:
SAM WALKER,
GEO. WALKER.